(12) United States Patent
Kim et al.

(10) Patent No.: US 11,010,213 B2
(45) Date of Patent: May 18, 2021

(54) ELECTRONIC DEVICE AND METHOD FOR PROVIDING EVENT MANAGEMENT SERVICE

(71) Applicant: SAMSUNG ELECTRONICS CO., LTD., Suwon-si (KR)

(72) Inventors: Myung-kyum Kim, Suwon-si (KR); Keun-jik Kim, Yongin-si (KR); Sae-na Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 264 days.

(21) Appl. No.: 15/770,875

(22) PCT Filed: Nov. 16, 2016

(86) PCT No.: PCT/KR2016/013192
§ 371 (c)(1),
(2) Date: Apr. 25, 2018

(87) PCT Pub. No.: WO2017/090931
PCT Pub. Date: Jun. 1, 2017

(65) Prior Publication Data
US 2018/0321991 A1    Nov. 8, 2018

(30) Foreign Application Priority Data
Nov. 23, 2015    (KR) .................... 10-2015-0164267

(51) Int. Cl.
*G06F 9/54*      (2006.01)
*H04W 76/10*    (2018.01)
(Continued)

(52) U.S. Cl.
CPC .............. *G06F 9/542* (2013.01); *H04W 4/06* (2013.01); *H04W 76/10* (2018.02); *H04W 84/18* (2013.01); *H04W 8/22* (2013.01); *H04W 24/02* (2013.01)

(58) Field of Classification Search
CPC ....................................................... G06F 9/542
(Continued)

(56) References Cited

U.S. PATENT DOCUMENTS 7,660,287 B2   2/2010   Axelsson et al.
8,160,572 B2   4/2012   Bovet
(Continued)

FOREIGN PATENT DOCUMENTS

CN       1926820      3/2007
CN     101571932    11/2009
(Continued)

OTHER PUBLICATIONS

International Search Report for PCT/KR2016/013192, dated Mar. 13, 2017, 2 pages.
(Continued)

*Primary Examiner* — Andy Ho
(74) *Attorney, Agent, or Firm* — Nixon & Vanderhye, P.C.

(57) ABSTRACT

Disclosed are an electronic device and method for providing an event management service. The method for providing an event management service in an electronic device according to the present invention comprises the steps of: carrying out communication with a plurality of external devices; checking at least one of the communication connection state with the plurality of external devices and the state information of the plurality of external devices on the basis of packet information received from the plurality of external devices, and determining whether an event has occurred with respect
(Continued)

to the external devices; when it is determined that an event has occurred from one of the plurality of external devices, generating event information on the external device for which an event has occurred and transmitting the event information to a management server; and when solution information for the event information is received from the management server, carrying out a processing operation for the event on the basis of the solution information. Accordingly, an electronic device can manage issues that arise during a process in which a communication connection is made between the electronic device and a low-specification external device.

20 Claims, 12 Drawing Sheets

(51) Int. Cl.
*H04W 84/18* (2009.01)
*H04W 4/06* (2009.01)
*H04W 8/22* (2009.01)
*H04W 24/02* (2009.01)

(58) Field of Classification Search
USPC .......................................................... 719/318
See application file for complete search history.

(56) References Cited

U.S. PATENT DOCUMENTS

| | | |
|---|---|---|
| 8,793,198 B1 | 7/2014 | Thomas |
| 9,641,553 B2* | 5/2017 | Ellis ........................ H04L 63/20 |
| 10,142,353 B2* | 11/2018 | Yadav ..................... H04L 43/04 |
| 2005/0015644 A1 | 1/2005 | Chu et al. |
| 2008/0137580 A1 | 6/2008 | Axelsson et al. |
| 2009/0252032 A1 | 10/2009 | Jiang et al. |
| 2012/0026898 A1 | 2/2012 | Sen et al. |
| 2012/0278473 A1 | 11/2012 | Griffiths |
| 2014/0005809 A1 | 1/2014 | Frei et al. |
| 2015/0019553 A1 | 1/2015 | Shaashua et al. |
| 2015/0097961 A1 | 4/2015 | Ure et al. |
| 2015/0244665 A1 | 8/2015 | Choi et al. |
| 2015/0276266 A1 | 10/2015 | Warren et al. |

FOREIGN PATENT DOCUMENTS

| | | |
|---|---|---|
| EP | 2 706 733 | 3/2014 |
| JP | 4287734 | 7/2009 |
| JP | 2010-287971 | 12/2010 |
| JP | 2012-74841 | 4/2012 |
| KR | 10-2005-0002603 | 1/2005 |
| KR | 10-2014-0013104 | 2/2014 |
| KR | 10-2015-0099388 | 8/2015 |
| WO | 2014/173432 | 10/2014 |

OTHER PUBLICATIONS

Written Opinion of the ISA for PCT/KR2016/013192, dated Mar. 13, 2017, 11 pages.
Extended Search Report dated Jul. 11, 2018 in counterpart European Patent Application No. 16868828.1.
Office Action dated Feb. 3, 2021 in counterpart Chinese Patent Application No. 201680066031A and English-language translation.

* cited by examiner

FIG. 4

| | INTERLOCKED STATE | PROTOCOL VER. | APPLICATION PROFILE VER. | DEVICE SW VER. | HUB SW VER. | OTHER CONNECTED DEVICES |
|---|---|---|---|---|---|---|
| ISSUE INFORMATION | SECURITY KEY MATCHING ERROR | ZIGBEE REV.20 | HOME AUTOMATION REV.26 | ZIGBEE PRO REV.16 | 1.5.4 | A MANUFACTURER BULLB<br>B MANUFACTURER TEMP SENSOR — 410<br>C MANUFACTURER VALVE |
| WEIGHT VALUE | 0.5 | 0.1 | 0.1 | 0.1 | 0.1 | 0.1 — 420 |

FIG. 8

| | INTERLOCKED STATE | PROTOCOL VER. | APPLICATION PROFILE VER. | DEVICE SW VER. | HUB SW VER. | OTHER CONNECTED DEVICES |
|---|---|---|---|---|---|---|
| ISSUE INFORMATION | SECURITY KEY MATCHING ERROR | ZIGBEE REV.20 | HOME AUTOMATION REV.26 | ZIGBEE PRO REV.16 | 1.5.4 | A MANUFACTURER BULLB<br>B MANUFACTURER TEMP SENSOR<br>C MANUFACTURER VALVE |
| WEIGHT VALUE | 0.5 | 0.1 | 0.1 | 0.1 | 0.1 | 0.1 |
| RELEVANT ISSUE A | SECURITY KEY MATCHING ERROR | ZIGBEE REV.20 | HOME AUTOMATION REV.26 | ZIGBEE PRO REV.14 | 1.5.4 | D MANUFACTURER ALARM |
| RELEVANT ISSUE B | SECURITY KEY MATCHING ERROR | ZIGBEE REV.20 | HOME AUTOMATION REV.24 | ZIGBEE PRO REV.16 | 1.5.4 | A MANUFACTURER BULLB<br>B MANUFACTURER TEMP SENSOR |

810 — (row ISSUE INFORMATION)
820 — (row RELEVANT ISSUE A)
830 — (row RELEVANT ISSUE B)

ELECTRONIC DEVICE AND METHOD FOR PROVIDING EVENT MANAGEMENT SERVICE

This application is the U.S. national phase of International Application No. PCT/KR2016/013192 filed 16 Nov. 2016, which designated the U.S. and claims priority to KR Patent Application No. 10-2015-0164267 filed 23 Nov. 2015, the entire contents of each of which are hereby incorporated by reference.

TECHNICAL FIELD

Devices and methods consistent with example embodiments relate to an electronic device for providing an event management service and a method, and more particularly, to an electronic device for providing a management service regarding an event occurring during a process in which a communication connection is made between an electronic device and an external device, and a method.

DESCRIPTION OF RELATED ART

The recent advancement of software technology has increased the expectation level of the user for quality. Accordingly, various research and development regarding an issue management method for improving defects occurring in quality of software are carried out. However, a related-art issue management method is merely a method that may be used in an environment with abundant resources, such as a smartphone, a PC, and the like.

In recent years, the advancement of Internet has enabled the implementation of an Internet-of-Things (IoT) service providing an environment in which all electronic devices can access network, and a variety of electronic devices that may be used through the IoT service have been developed.

In particular, electronic devices developed for low-cost purposes have relatively less resources, unlike high-performance electronic devices, such as smartphones, PCs, and smart air conditioners, which have abundant resources such as embedded software or OS. Therefore, electronic devices developed for the purpose of low-cost have a problem in that issue management for defects of software installed in electronic devices is weaker than that of high-performance electronic devices.

SUMMARY

The present disclosure is to address the problem according to the necessity described above, and the present disclosure is to manage, by an electronic device, issues which occur during a process in which a communication connection is made between the electronic device and an external device with low specification.

According to an aspect of an example embodiment, there is provided a method for providing an event management service in an electronic device, the method comprising: carrying out communication with a plurality of external devices; checking a communication connection state with the plurality of external devices and state information of the plurality of external devices on the basis of packet information received from the plurality of external devices and determining whether an event has occurred for the external device; in response to determining that an event has occurred from one of the plurality of external devices, generating event information on an external device for which the event has occurred and transmitting the generated event information to a management server; and in response to solution information for the event information being received from the management server, carrying out a processing operation for the event on the basis of the solution information.

The method may further include, in response to the event has occurred, determining an event type for an external device for which the event has occurred. The event information may include at least one of information on the event type, communication protocol information of the electronic device and the external device for which the event has occurred, application profile information, communication channel information, software information of the electronic device and the external device for which the event has occurred, and information on an other external device communicatively connected with the electronic device.

The management server may include at least one solution information according to an event type. The solution information received from the management server may be a solution corresponding to the event information from among the at least one solution.

The management server may determine similarity between the at least one solution information and the event information on the basis of a predetermined weight value for each of a plurality of information included in the event information, and transmit solution information having a highest similarity to the event information from among the at least one solution information to the electronic device.

The method may further include, in response to the solution information not being received within a predetermined time or in response to a signal for requesting history information being received from the management server, transmitting history information to the management server. The history information may be log/packet information transceived between the electronic device and the external device for which the event has occurred.

The management server may perform simulation for a communication state between the electronic device and the external device for which the event has occurred on the basis of the history information and the event information, analyze a cause of occurrence of the event through the simulation, and generate solution information for resolving the event and transmit the generated solution information to the electronic device.

The performing may further include automatically carrying out a processing operation for the event on the basis of the solution information received from the management server.

The performing may include displaying guide information for resolving the event on the basis of the solution information received from the management server, and carrying out a processing operation for the event according to an execution command for the guide information.

The method may further include, in response to the processing operation for the event is performed on the basis of the solution information, transmitting an event processing message to the management server.

The external device may be communicatively connected with the electronic device via a non-IP communication protocol.

According to an aspect of an example embodiment, there is provided an electronic device, comprising: a communicator configured to carry out communication with at least one of a plurality of external devices and a management server; and a controller (or a processor) configured to check at least one of a communication connection state with a plurality of external devices and state information of the plurality of external devices on the basis of packet information received from the plurality of external devices, in response to determining that an event has occurred from one of the plurality of external devices, to generate event information on the external device for which the event has occurred and transmit the generated event information to the management server, and in response to solution information for the event information being received from the management server, carrying out a processing operation for the event on the basis of the solution information.

The controller, in response to determining that the event has occurred, determines an event type for the external device for which the event has occurred. The event information may include at least one of information on the event type, communication protocol information of the electronic device and the external device for which the event has occurred, application profile information, communication channel information, software information of the electronic device and the external device for which the event has occurred, and information on an other external device communicatively connected with the electronic device.

The management server may include at least one solution information according to an event type. The solution information received from the management server may be a solution corresponding to the event information from among the at least one solution.

The management server may determine similarity between the at least one solution information and the event information on the basis of a predetermined weight value for each of a plurality of information included in the event information, and transmit solution information having a highest similarity to the event information from among the at least one solution information to the electronic device.

The controller may, in response to the solution information not being received within a predetermined time or in response to a signal for requesting history information being received from the management server, transmit history information to the management server. The history information may be log/packet information transceived between the electronic device and the external device for which the event has occurred.

The management server may perform simulation for a communication state between the electronic device and the external device on the basis of the history information and the event information, analyze a cause of occurrence of the event through the simulation, and generate solution information for resolving the event and transmit the generated solution information to the electronic device.

The controller may automatically carry out a processing operation for the event on the basis of the solution information received from the management server.

The electronic device may further include a display. The electronic device may control the display to display guide information for resolving the event on the basis of the solution information received from the management server, and may perform a processing operation for the event according to an execution command for the displayed guide information.

The controller may, in response to an operation related to the event being performed on the basis of the solution information, generates an event processing message, and control the communicator to transmit the generated event processing message to the management server.

The communicator may include a first communicator configured to carry out data communication with the plurality of external devices via a non-IP communication protocol and a second communicator configured to carry out data communication with the management server via an IP communication protocol.

According to the present disclosure, an electronic device can manage issues that arise during a process in which a communication connection is made between the electronic device and a low-specification external device.

BRIEF DESCRIPTION OF THE DRAWINGS

FIG. 4 is a diagram illustrating event information relating to an event that has occurred between an electronic device and an external device, according to an example embodiment.

FIG. 8 illustrates an example diagram which provides, by a management server, solution information for event information, according to an example embodiment.

DETAILED DESCRIPTION OF EXAMPLE EMBODIMENTS

Figure 1:
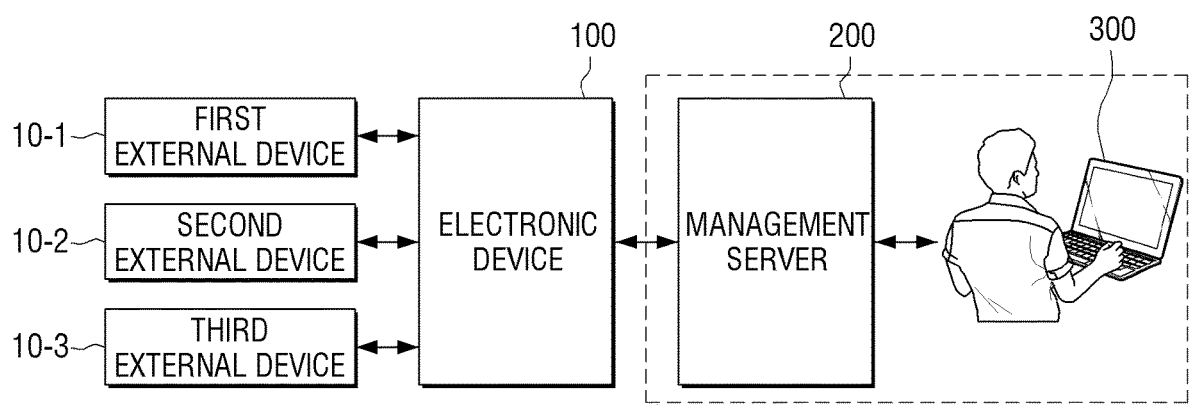
FIG. 1 is a view illustrating a task management system according to an embodiment of the present disclosure.

Prior to explaining embodiments of the present disclosure, an explanation will be made on a method by which embodiments of the present specification and drawings are disclosed.

First of all, the terms used in the present specification and the claims are general terms selected in consideration of the functions of the various embodiments of the present disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed on the basis of the overall contents and technological common sense of those skilled in the related art.

Also, the same reference numerals or symbols described in the attached drawings denote parts or elements that actually perform the same functions. For convenience of descriptions and understanding, the same reference numerals or symbols are used and described in different exemplary embodiments. In other words, although elements having the same reference numerals are all illustrated in a plurality of drawings, the plurality of drawings do not mean one exemplary embodiment.

Further, the terms including numerical expressions such as a first, a second, and the like may be used to explain various components, but there is no limitation thereto. The ordinal numbers are used in order to distinguish the same or similar elements from one another, and the use of the ordinal number should not be understood as limiting the meaning of the terms. For example, an element combined with an ordinal number is not limited because of the ordinal number in the order the element is being used, in the order the element is being disposed, and so on. The respective ordinal numbers are interchangeably used, if necessary.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor (not illustrated).

Further, in embodiments of the present disclosure, when it is described that a portion is connected to another portion, the portion may be either connected directly to the other portion, or connected indirectly via another medium. Further, when a certain portion includes a certain element, unless specified to the contrary, this means that another element may be additionally included, rather than precluding another element.

Hereinafter, the present disclosure will be described in detail with reference to the accompanying drawings.

FIG. 1 is a view illustrating a task management system according to an embodiment of the present disclosure.

As illustrated in FIG. 1, an event management service system may include an electronic device 100 which is communicatively connected with an external device 10, a management server 200, and a host device 300.

The external device 10 performs data communication with the electronic device 100 through a near field wireless communication method. According to an example embodiment, the external device 10 may be an device not including the remaining interface configurations excluding a non-IP communication protocol such as Zigbee communication, Z-Wave, Bluetooth and the like. This external device 100 may, for example, be a wireless headset, wireless earphones and the like. However, the example is not limited thereto, and in a case in which the electronic device 100 is an device for controlling an Internet-of-Things (IoT) service-related device, the external device may be a temperature sensor included in a household, a light switch, and the like.

The electronic device 100 may be a terminal which performs data communication with the external device 10 through a near field wireless communication method. The electronic device 100 may be an device which is capable of performing wireless communication, such as a smartphone, a smart TV, and a tablet PC. However, the example is not limited thereto, and an device which is capable of being communicatively connected with the external device 100 via a Non-IP communication protocol may be an electronic device 100 according to the present disclosure.

The management server 200 checks at least one of a communication connection state between the electronic device 100 and the external device 10 and state information of the external device 100 communicatively connected with the electronic device 100 and provides solution information for providing a processing operation of an event regarding the external device 10.

The host device 300 may register and store solution information for each event type implemented by an engineer in the management server 200. These management server 200 and host device 300 may be configured in a single configuration.

In more detail, as illustrated in FIG. 1, the electronic device 100 may be communicatively connected with first and second external devices 10-1, 10-2 from among a plurality of external devices 100. In a state in which the electronic device 100 is communicatively connected with the first and second external devices 10-1, 10-2, the electronic device 100 may perform communicative connection with a third external device 10-3 according to a user request.

Meanwhile, the electronic device 100, when an event occurs in a process of carrying out communication with the third external device 10-3, determines a type of the event occurring during a process in which a communication connection is made between the electronic device 100 and the third external device 10-3, and generates event information including the determined event type information and transmits the generated event information to the management server 200. In this regard, an event occurring during a process in which a communication connection is made between the electronic device 100 and the third external device 10-3 may be an error in which an error occurs in the communication connection process between the electronic device 100 and the third external device 10-3.

In this regard, the event information may include at least one of event type information relating to an event occurring between the electronic device 100 and the third external device 10-3, communication protocol information and application profile information of the electronic device 100 and the third external device 10-3 in which the event has occurred, communication channel information, software information of the electronic device 100 and the third external device 10-3 in which the event has occurred, and information relating to first and second external devices 10-1, 10-2 communicatively connected with the electronic device 100.

The management server 200 receiving this event information acquires solution information which is the most similar to the received event information from among a plurality of pre-stored solution information on the basis of a weight predetermined for each of a plurality of information included in the event information and transmits the acquired solution information.

In more detail, the management server 200 may store at least one solution information according to a type of event. In other words, an engineer may define such that at least one solution information is matched according to a type of event.

Accordingly, the management server 200 may store issue information relating to each of event types according to a condition defined by the engineer and a ruleset table to which at least one solution information is matched.

In this regard, the issue information may include at least one of event type information, communication protocol information, application profile information, software information of a hub device and a device, and information relating to the other device communicatively connected to the hub device. In this regard, the software information of the hub device is information for determining similarity of software information of the electronic device 100 described above. The software information of the device is information for determining similarity of software information of the third external device 10-3. In addition, the information relating to the other device is information for determining similarity with respect to information relating to the first and second external devices 10-1, 10-2 described above.

Accordingly, the management server 200 determines whether each information included in the event information is consistent with each information included for each issue information with reference to a pre-stored ruleset table. Thereafter, the management server 200 acquires information which is consistent with the information included in the event information from among each information for each issue information, and calculate the sum of pre-stored weights regarding the acquired information. Thereafter, the management server 200 acquires issue information which has the highest sum of weights from among the calculated sum of weights. When the issue information is acquired, the management server 200, with reference to a pre-stored ruleset table, acquires solution information matched with pre-acquired issue information and transmits the acquired solution information to the electronic device 100.

Meanwhile, when a plurality of issue information having the highest sum of weights is acquired, the management server 200 may acquire all solution information matched with each of the plurality of issue information and transmit the acquired solution information to the electronic device 100.

When the sum of weights for each information included in the issue information acquired regarding the received event information is less than a predetermined threshold value or solution information for the received event information is not acquired, the management server 200 transmits a signal to request history information to the electronic device 100. Accordingly, the electronic device 100 transmits history information to the management server 200. However, the example is not limited thereto, and the electronic device 100 may, when, after the event information is transmitted to the management server 200, solution information is not received from the management server 200 within a predetermined threshold time, transmit history information to the management server 200.

In addition, the history information may be log/packet information which is transmitted or received during a process in which a communication connection is made between the electronic device 100 and the third external device 10-3.

When history information including this log/packet information is received, the management server 200 transmits the received history information and the received event information to the host device 300. The host device 300 performs simulation regarding a communicative connection process between the electronic device 100 and the third external device 10-3 by using information included in the history information and event information received from the management server 200. Thereafter, the host device 300 analyzes a cause of an error that has occurred through simulation, and generates solution information for resolving the corresponding error and transmits the generated solution information to the management server 200.

As described above, the management server 200 and host device 300 may be implemented in a single configuration. In this regard, the management server 200 may perform simulation regarding a communicative connection process between the electronic device 100 and the third external device 10-3 on the basis of the history information and event information received from the external device 100, and generate solution information regarding an error that has occurred, through simulation.

Thereafter, the management server 200 transmits the solution information generated regarding the event information to the electronic device 100. In addition, the management server 200 may register the event information as new issue information, and match the registered issue information with the corresponding solution information and register and store the matched information in a pre-stored ruleset table.

Meanwhile, when the solution information for resolving an error that has occurred during a process in which a communication connection is made between the management server 200 and the third external device 10-3 is received, the electronic device 100 performs a processing operation regarding the corresponding event on the basis of the received solution information.

According to an example embodiment, when the solution information is received, the electronic device 100 may automatically perform a communication setting between the electronic device 100 and the third external device 10-3 on the basis of the received solution information.

According to another example embodiment, when the solution information is received from the management server 200, the electronic device 100 may display guide information for resolving errors on the basis of the received solution information, and perform a communication setting between the electronic device 100 and the third external device 10-3 according to an execution command regarding the displayed guide information.

Meanwhile, according to an example embodiment, the electronic device 100 may not only determine an event occurring during a process in which a communication connection is made with respect to the third external device 10-3 but also determine whether an event of at least one of the first and second external devices 10-1, 10-2 has occurred on the basis of state information of at least one of the communicatively connected first external device 10-1 and the communicatively connected second external device 10-2.

For example, the first external device 10-1 may be a temperature sensor which detects an ambient temperature. In this regard, the temperature sensor periodically detects an ambient temperature and transmits state information relating to the detected temperature to the electronic device 100 via a packet. Accordingly, the electronic device 100 may monitor the detected in the first external device 10-1 on the basis of state information included in the packet information received from the first external device 10-1, and when it is determined that a temperature of less than a predetermined threshold temperature or a temperature of greater than or equal to the predetermined threshold temperature is detected, generate the corresponding event information and transmits the generated event information to the management server 200.

In this case, the event information may include at least one of event type information relating to the first external device 10-1, communication protocol information and application profile information of the electronic device 100 and the first external device 10-1 in which the event has occurred, communication channel information, software information of the electronic device 100 and the first external device 10-1 in which the event has occurred, and information relating to a second external device 10-2 communicatively connected with the electronic device 100.

The management server 200 receiving this event information, as described above, acquires solution information which is the most similar to the received event information from among a plurality of pre-stored solution information on the basis of a weight predetermined for each of a plurality of information included in the event information and transmits the acquired solution information.

Accordingly, the electronic device 100 provides guide information for decreasing or increasing an ambient temperature on the screen on the basis of the received solution information. Accordingly, the user may readjust a temperature setting on the basis of the guide information provided on the screen.

Hereinabove, an operation of each configuration of an event management service system is briefly described. Hereinbelow, an electronic device 100 according to an example embodiment will be described.

Figure 2:
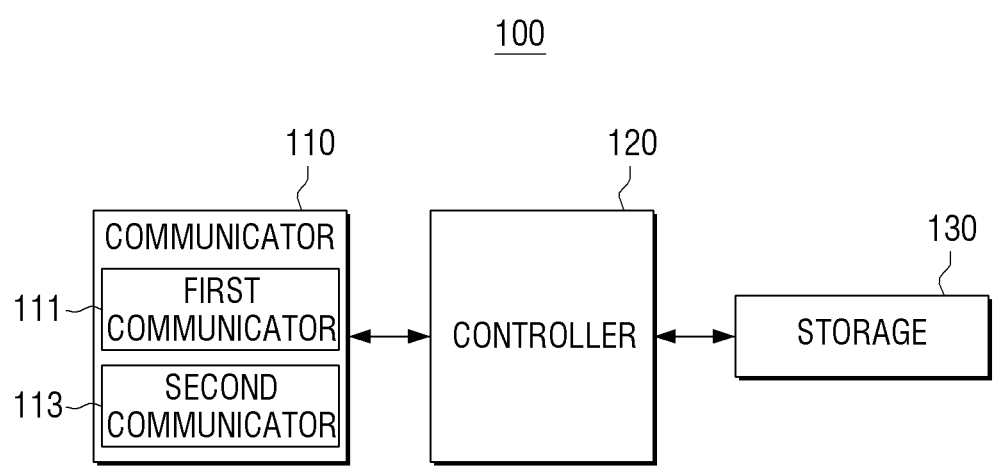
FIG. 2 is a block diagram of an electronic device, according to an example embodiment of the present disclosure.

FIG. 2 is a block diagram of an electronic device, according to an example embodiment of the present disclosure.

As illustrated in FIG. 2, the electronic device 100 includes a communicator 110, a controller 120, and a storage 130.

The communicator 110 performs a data communication with at least one external device 10 and a management server 200. This communicator 110 may include a first communicator 111 and a second communicator 113. The first communicator 111 may perform a data communication with the external device 10 via a near field communication module, and the second communicator 113 may perform a data communication with the management server 200 by using a wireless communication module.

According to an example embodiment, the first communicator 111 which performs a data communication with the external device 10 via a near field communication module may be communicatively connected with the external device 100 by using a non-IP communication protocol, such as ZigBee communication, Z-wave, Bluetooth, and the like.

In addition, the second communicator 113 may perform a data communication with the management server 200 via a wireless communication module which is connected to an external network and performs communication according to an IP communication protocol, such as IEEE and the like. However, the example is not limited thereto, and the second communicator 113 may perform a data communication with the management server 200 via a mobile communication module which is connected to a mobile communication network according to various mobile communication standards such as 3rd generation (3G), 3rd generation partnership project (3GPP), and long term evolution (LTE) to perform communications.

The controller 120 controls the overall operation of the respective components of the electronic device 100. In particular, the controller 120, on the basis of packet information received from at least one of a plurality of external devices 10 via the first communicator 111, determines at least one of a communication connection state of the external device 10 communicatively connected with the electronic device 100 and state information of the external device and determines whether an event relating to the external device 100 has occurred.

Upon determination, when it is determined that an event has occurred from one of the plurality of external devices 10, the controller 120 generates event information relating to an external device 100 in which the event has occurred, controls the second communicator 113 to transmit the generated event information to the management server 200, and when solution information for the event information received from the management server 200 via the second communicator 113 is received, performs a processing operation with respect to the event on the basis of the received solution information.

In more detail, when it is determined that an event has occurred from at least one external device 100, the controller 120 determines a type of event relating to the external device 10 in which the event has occurred, and generates event information on the basis of the determined event type.

In this regard, the event information may include at least one of event type information relating to an event occurring between the electronic device 100 and an external device 10, communication protocol information and application profile information of the electronic device 100 and the external device 10 in which the event has occurred, communication channel information, software information of the electronic device 100 and the external device 10 in which the event has occurred, and information relating to the other external device 10 communicatively connected with the electronic device 100.

When this event information is generated, the controller 120 controls the second communicator 113 to transmit the event information to the management server 200. Accordingly, the second communicator 113 may transmit the event information to the management server 200.

The management server 200 receiving the event information compares information included in each of a plurality of information included in the event information and pre-stored issue information and acquires issue information including the same information as at least one of information included in the event information. Thereafter, the management server 200 calculates the sum of weights applied to the same information as the information included in the event information from among information included in the acquired issue information, and acquires issue information having the highest calculated sum of weights from among all calculated sums of weights. Thereafter, the management server 200 acquires solution information matched regarding the acquired issue information and transmits the acquired solution information to the electronic device 100.

As described above, an operation of providing, in the management server 200, solution information for resolving an error that has occurred in the process of communicative connection between the electronic device 100 and the external device 10 on the basis of event information received from the electronic device 100 will be described in greater detail below.

When the solution information is received from the management server 200, the controller 120 performs a processing operation with respect to an event that has occurred between the electronic device 100 and the external device 10 on the basis of the received solution information.

According to an example embodiment, an event occurring between the electronic device 100 and the external device 10 may be an event regarding an error that has occurred in the process of communicative connection between the electronic device 100 and the external device 10. In this regard, the controller 120 may perform communicative connection between the electronic device 100 and the external device 100 on the basis of the solution information received from the management server 200.

According to an example embodiment, the controller 120 may automatically perform a communication setting between the electronic device 100 and the external device 10 on the basis of solution information received from the management server 200.

According to another example embodiment, the controller 120 provide guide information for resolving an error that has occurred in the process of communicative connection between the electronic device 100 and the external device 10 on the basis of the solution information received from the management server 120. Accordingly, the display 181, which will be described later, may display the guide information, and the user may input an execution command for communication setting between the electronic device 100 and the external device 10 on the basis of the displayed guide information. Thus, the controller 120 may perform a communication setting between the electronic device 100 and the external device 10 on the basis of the execution command of the user.

Meanwhile, an event occurring between the electronic device 100 and the external device 10 may be an event which is determined on the basis of state information included in packet information received from the external device 100 communicatively connected with the electronic device 100.

For example, the external device 10 communicatively connected with the electronic device 100 may be a temperature sensor which detects an ambient temperature. In this regard, the temperature sensor periodically detects an ambient temperature and transmits state information relating to the detected temperature to the electronic device 100 via a packet. Accordingly, the controller 120 may monitor a temperature detected in a temperature sensor on the basis of state information included in the packet information received from the external device, and when it is determined that a temperature of less than a predetermined threshold temperature or a temperature of greater than or equal to the predetermined threshold temperature is detected, generate the corresponding event information and transmits the generated event information to the management server 200.

Thereafter, when solution information for event information is received from the management server 200, the controller 120 provides guide information for decreasing or increasing an ambient temperature on the screen on the basis of the received solution information. Accordingly, the user can set perform a temperature setting on the basis of the guide information provided on the screen, and the controller 120 may adjust a peripheral device, for example, a temperature of an air conditioner, which is capable of communicating with the electronic device 100 on the basis of the temperature setting command of the user.

Meanwhile, when a processing operation for an event that has occurred between the electronic device 100 and the external device 10 is performed on the basis of the solution information received from the management server 200, the controller 120 sends an event processing message to the management server 200. Accordingly, the management server 200 may determine that an event that had occurred between the electronic device 100 and the external device 100 has been processed on the basis of the event processing message received from the management server 200.

Furthermore, when it is determined that an event occurring between the electronic device 100 and the external device 100 has been processed on the basis of the received event processing message, the management server 200 may update a use history of solution information provided regarding the event, and when a plurality of solution information is acquired regarding an event similar to the event, select one of the plurality of solution information on the basis of the updated use history and provide the selected solution information.

Meanwhile, after event information is transmitted to the management server 200, when solution information for resolving an event occurring between the electronic device 100 and the external device 10 is not received from the management server 200 within a predetermined threshold time or a signal requesting history information is received from the management server 200, the controller 120 transmits history information to the management server 200 via a second communicator 113.

In this regard, the history information may include log/packet information sent/received between the electronic device 100 and the external device 10, and this history information may be stored in the storage 130. Accordingly, the controller may analyze a type of event that has occurred between the electronic device 100 and the external device 10 on the basis of the log/packet information stored in the storage 130. When the solution information for resolving an event is not received from the management server 200, the controller 120 may transmits history information including log/packet information sent/received to/from the external device 10 to the management server 200.

As described above, when the host device 300 and the management device 200 are implemented in one configuration, the management server 200 performs simulation with respect to an event occurring between the electronic device 100 and the external device 10 on the basis of the history information received from the electronic device 100 and the event information received from the electronic device 100. Thereafter, the management server 200 generates solution information for resolving an event by analyzing a cause of an event that has occurred through simulation, and transmits the generated solution information to the electronic device 100.

When solution information for the event information is generated, the management server 200 may register the event information as new issues information, and match the registered issue information and the corresponding solution information and register and store the matching.

Figure 3:
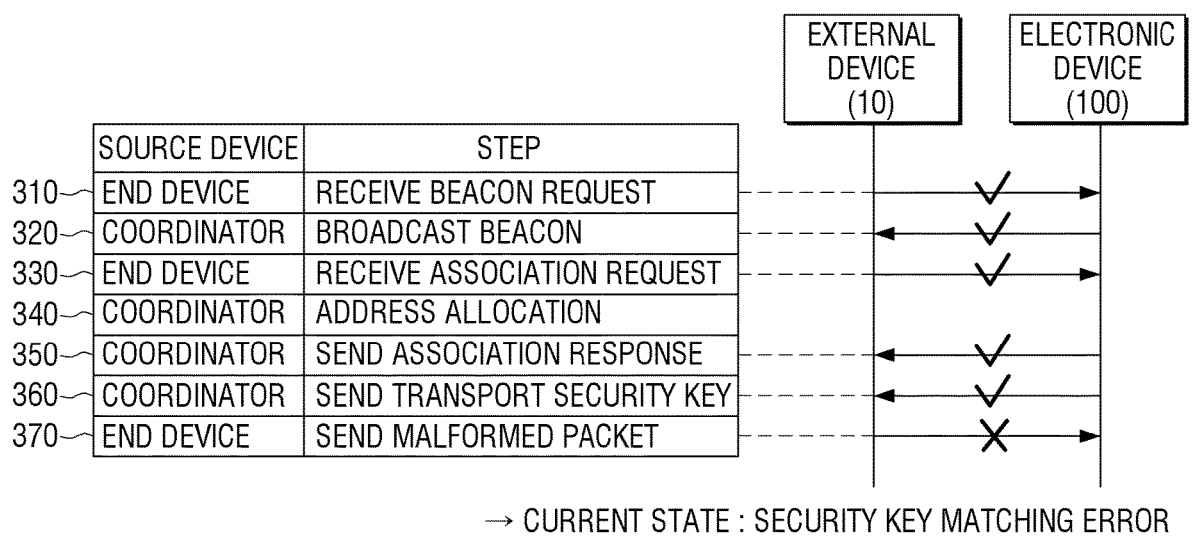
FIG. 3 is a diagram illustrating an example event occurring between an electronic device and an external device, according to an example embodiment.

FIG. 3 is a diagram illustrating an example event occurring between an electronic device and an external device, according to an example embodiment.

As illustrated in FIG. 3, the electronic device 100 may be communicatively connected with an external device 10 through a series of communicative connection processes defined in a standard regarding a near field wireless communication method.

In more detail, the external device 10, for communicative connection with the electronic device 100, transmits a receive beacon request message 310, and when the receive beacon request message 310 is received from the external device 10, the electronic device 100 sends a broadcast beacon message 320 to the external device 10. The external device 10 that has received the broadcast beacon message 320 sends a receive association request message 330 to the electronic device 100. When the receive association request message 330 is received from the external device 10, the electronic device performs an address allocation 340 and transfers a send association response message 350 to the external device 10. Thereafter, the electronic device 100 sends a second transport security key message 360 including an encryption key for communicative connection with the external device 10. The external device 10 sends a send malformed packet message 370 to the electronic device 100 on the basis of the received send transport security key message 360.

As described above, the electronic device 100 may send/receive packet information through a series of communicative connection processes with the external device and perform communicative connection with the external device 10. Meanwhile, as illustrated in the drawing, the electronic device 100 may determine that an error that an encryption key is not matched has occurred from the send malformed packet message 370 received from the external device 10.

For example, the electronic device 100 may perform a communicative connection using Zigbee communication with the electronic device 10. In the Zigbee communication, a network key and a link key are used for information security. In this regard, the link key may be a key which is predefined to use to encrypt a packet frame in an APS layer or a key which is assigned from an external source. In addition, the network key may be a key which is used in the same manner in all external devices connected to the same network and may be encrypted by the link key.

Accordingly, the electronic device, when a communicative connection is performed with the external device 10 via a Zigbee communication, uses the same link key as the external device 10 to be communicatively connected. If a link key of the electronic device 100 is different from that of the external device 10, the electronic device 100 does not correctly interpret a packet encrypted by the link key of the external device 10. Accordingly, the electronic device 100 may determine that an error has occurred in the process of communicative connection with the external device 10.

As described above, the electronic device 100 according to an example embodiment may determine that an error has occurred in the process of communicative connection with the external device 100 on the basis of log/packet information sent or received to communicatively connect with the external device 10. When it is determined that an error has occurred, the electronic device 100 may determine a type of event with respect to an error that has occurred in the process of communicative connection between the electronic device 100 and the external device 10, and generate event information including the determined event type and transmit the generated event information to the management server 200.

As another example, the electronic device 100 may perform a communicative connection with a security guard-related external device 10 via a Z-wave communication. Meanwhile, the security guard-related external device 100 may support an anti-theft command class V1, and the electronic device 100 may support only an updated anti-theft command class V2 which is updated regarding the anti-theft command class V1.

In this regard, an error may occur due to mismatching of versions of a communication protocol in the process of communicative connection between the electronic device 100 and the external device 10. Accordingly, the electronic device 100 may generate event information including an error-related event type regarding this communication protocol version and transmit the generated event information to the management server 200.

FIG. 4 is a diagram illustrating event information relating to an event that has occurred between an electronic device and an external device, according to an example embodiment.

As described above, the event information may include event type information, communication protocol information, application information, software information of the electronic device 100 and the external device 10 and information relating to the other external device 10 communicatively connected with the electronic device 100.

For example, the electronic device 100 may perform a communicative connection using a Zigbee communication method with the external device 100. A matching error of the authentication key for security may occur during a process in which a communication connection is made using the Zigbee communication method. In addition, the electronic device 100 may communicatively connected with the external device 10 manufactured by an A manufacturer or a B manufacturer.

In this case, the electronic device 100 may generate event information 410 that includes event type information (security key matching error), communication protocol information (ZigBee rev.20), application information (Home automation rev. 26), software information of an external device 10 (ZigBee Pro rev. 16), software information of the electronic device 100 (1.5.4) and information relating to the other external device 10 (Bulb by A manufacturer, temp sensor by B manufacturer, valve by C manufacturer).

Meanwhile, a weight value may be set in each of information included in the event information 410 in view of the importance of each information. As illustrated in the drawings, the highest weight value (0.5) may be set in the event type information (Security Key Matching Error) in comparison with other information according to the importance of each information included in the event information 410, and the same weight value (0.1) can be set to the remaining information.

When this event information 410 is generated, the electronic device 100 transmits the generated event information 410 to the management server 200, and the management server 200 acquires solution information for the event information received from the electronic device 100 and transmits the acquired solution information to the electronic device 100.

Accordingly, the electronic device 100 may perform communicative connection between the electronic device 100 and the external device 100 on the basis of the solution information received from the management server 200.

Meanwhile, in a case in which the electronic device is implemented as a smartphone and a communicative connection with the external device 100 is performed via the electronic device 100 which is a smartphone, the electronic device 100 may further include the feature as shown below, in addition to the above-described features.

Figure 5:
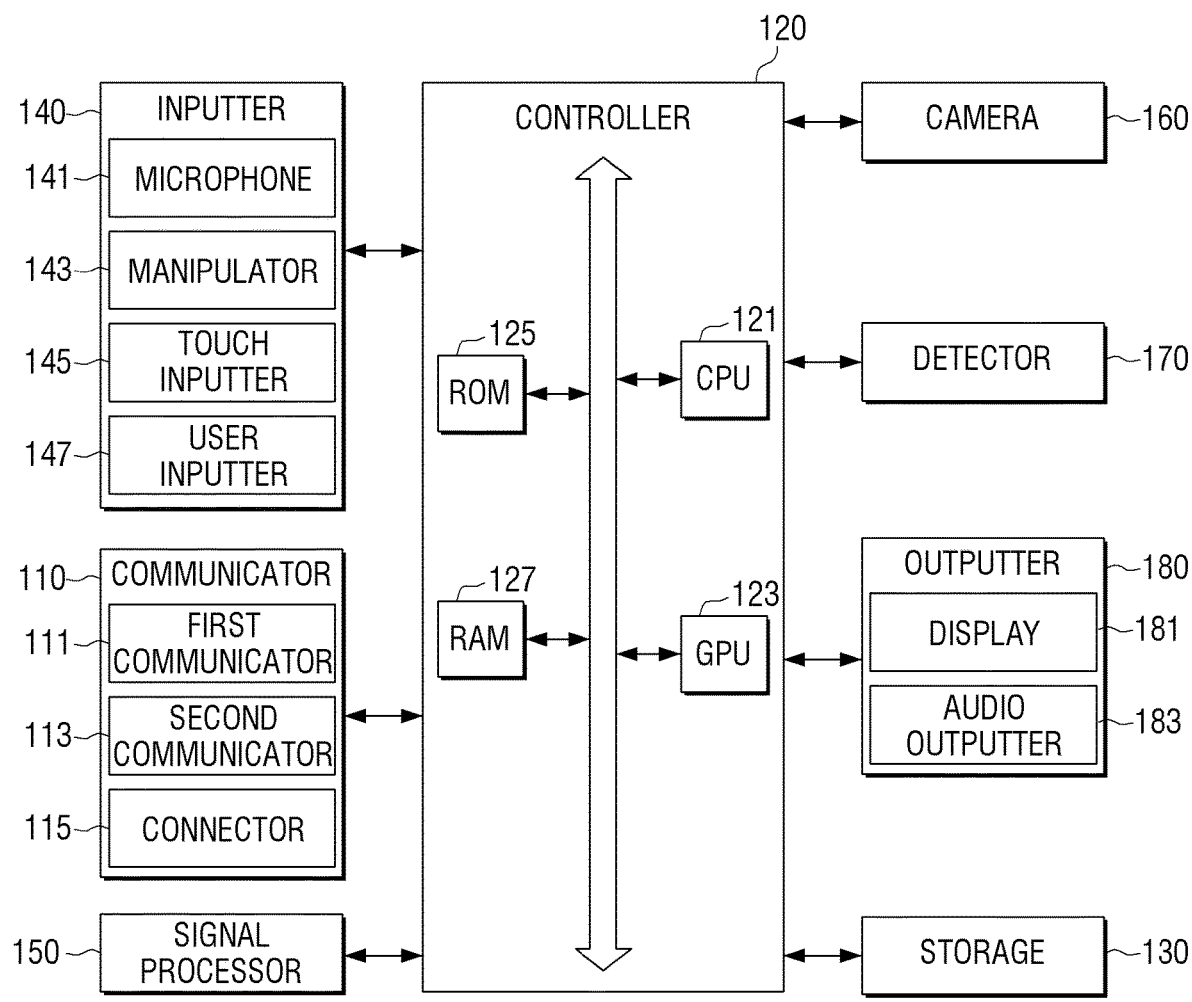
FIG. 5 is a detailed block diagram of an electronic device, according to an example embodiment of the present disclosure.

FIG. 5 is a detailed block diagram of an electronic device, according to an example embodiment of the present disclosure.

As illustrated in FIG. 5, in a case in which the electronic device 100 is implemented as a display device, such as a smartphone, a tablet PC, and a smart TV, the electronic device 100 may further include an inputter 140, a signal processor 150, a camera 160, a detector 170, and an outputter 180 in addition to the communicator 110, the controller 120, and the storage 130.

Prior to the description of the additional configurations, the communicator 110 described above may further include a connector 115 in addition to the first communicator for near field wireless communication and the second communicator 113 for wireless communication.

The connector 113 is a configuration for providing an interface with a variety of source devices, such as USB 2.0, USB 3.0, HDMI, IEEE 1394, and the like. This connector 113 may receive content data received from an external server (not illustrated) via a cable connected with the connector 113 according to a control command of the controller 120, or may transmit a pre-stored content data to an external recording medium. Further, the connector 113 may receive power from a power source through the wired cable physically connected to the connector 113.

The input 140 is an input means receiving various user commands and transferring the input user command to the controller 120 and as illustrated, may include a microphone 141, a manipulator 143, a touch inputter 145, and a user inputter 147.

The microphone 141 may receive the voice command of the user and the manipulator 143 may be implemented by a key pad including various function keys, a numeric key, a special key, a character key, or the like. In addition, the touch inputter 145, in a case in which the display 181 which will be described later, is implemented in the form of a touch screen, may be implemented as a touch pad forming a interlayer structure with the display 181. In this case, the touch inputter 145 may receive a selection command regarding various application-related icons displayed on the display 181.

The user input 147 may receive an IR signal or an RF signal for controlling the operation of the electronic device 100 from at least one peripheral device (not illustrated) like a remote control device.

The signal processor 150 may be an element for processing, according to a control command of the controller 120, a content received via the communicator 110 or image data and audio data of a content stored in the storage 130. In more detail, the signal processor 150 may perform various image processes, such as decoding, scaling, noise filtering, frame rate conversion, resolution conversion, and the like, on the image data included in the content. Further, the signal processor 150 may perform various audio signal processing, such as decoding, amplification, and noise filtering, on the audio data included in the content.

The camera 160 is to photograph still images or moving images according to the user command and may be implemented in plural like a front camera and a rear camera.

The detector 170 detects various operation states and user interactions of the electronic device 100. In addition, the detector 170 may detect an inclination of the electronic device 100 grabbed by the user, etc. on the basis of a rotating motion or a gravity direction using at least one of various sensors, such as a magnetic sensor, gyro sensor, acceleration sensor, and the like.

The outputter 180 outputs a content signal-processed through the signal processor 150. The outputter 180 may output a content through at least one of the display 181 and the audio outputter 183. The display 181 may display image data image-processed by the signal processor 150, and the audio outputter 183 may output the audio signal-processed audio data in the form of audible sound.

Meanwhile, the display 181 which displays image data may be implemented as a liquid crystal display (LCD), an organic light emitting display (OLED), or a plasma display panel (PDP), but is not limited thereto. In particular, the display 181 may be implemented in a touch screen form having a mutual layer structure with a touch input 145 described above.

Meanwhile, the controller 120 described above may include a CPU 121, a GPU, a ROM 125, and a RAM 127. The CPU 121, the GPU 123, the ROM 125, and the RAM 127 may be interconnected with each other via a bus.

The CPU 121 accesses the storage 130 and performs booting using the O/S stored in the storage 130. In addition, the CPU 121 performs various operations using various programs, contents, and data stored in the storage 130.

The GPU 123 generates a display screen including a variety of objects, such as an icon, an image, a text, and the like. In more detail, the GPU 123 calculates an attribute value, such as a coordinate value, shape, size and color of each of the objects to be displayed, according to a layout of a screen on the basis of the received control command, and generates a display screen of various layouts including the object on the basis of the calculated attribute value.

The ROM 125 may store a command set, and the like for system booting. If a turn-on command is input and the power is supplied, the CPU 121 copies the O/S stored in the memory 130 into the RAM 127 according to the command stored in the ROM 125, and boots the system by executing the O/S. When the booting is completed, the CPU 121 may copy the various programs stored in the storage 130 to the RAM 127, and perform various operations by implementing the programs copied to the RAM 127.

The controller 120 may be implemented by a system-on-a chip (SOC) or a system on chip (Soc) by being combined with each of configurations described above.

Meanwhile, the above-described operations of the processor 120 may be performed through the programs stored in the storage unit 130. In this regard, the storage 130 may be implemented by using at least one of a memory card (e.g., an SD card and a memory stick) which can be mounted in or dismounted from a read only memory (ROM) 125, a random access memory (RAM) 127, or the electronic device 100, a non-volatile memory, a volatile memory, a hard disk drive (HDD), and a solid state drive (SSD).

Hereinbelow, a management server 200 described above will be described.

Figure 6:
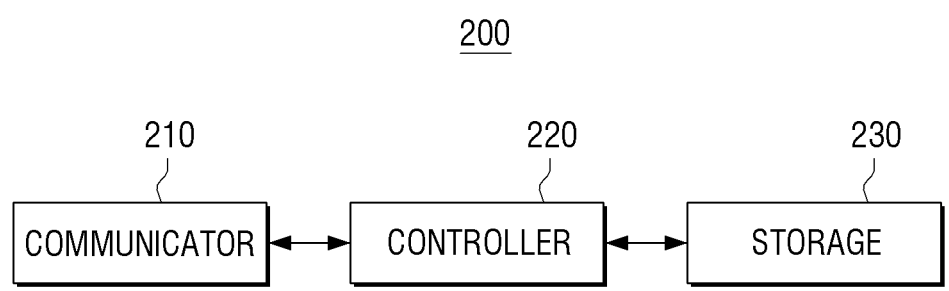
FIG. 6 is a block diagram of a management server, according to an example embodiment.

FIG. 6 is a block diagram of a management server, according to an example embodiment.

As shown in FIG. 6, the management server 200 may include a communicator 210, a controller 220, and a storage 230.

As described above, the communicator 210 performs a data communication with the electronic device 100 and transmits solution information for resolving an error occurring in the process of communicative connection between the electronic device 100 and the external device 10 to the electronic device 100.

In addition, in a case in which the communicator 210 is not implemented in a single configuration with the host device 300, the host device 300 may perform a data communication and register solution information generated in the host device 300 and store it. Hereinafter, it will be assumed that the host device 300 is implemented in a single configuration.

This communicator 210 may, like the electronic device 100 and the communicator 110 described above, perform a data communication with the electronic device 100 or the host device 300 via the electronic device 100 or the host device 300 via at least one module from among a near field wireless communication module, a wireless communication module, and a wired communication module.

The controller 220 controls the overall operation of the respective components of the management server 200. In particular, when event information relating to an event that has occurred between the electronic device 100 and the external device 10 is received from the electronic device 100, the controller 220 acquires solution information for the received event information from among a plurality of solution information pre-stored in the storage 230, and transmits the acquired solution information to the electronic device 100.

The storage 230, as described above, stores issue information corresponding to each of events occurring in the process of communicative connection with an external device 10 communicatively connected with at least one from among a plurality of electronic devices which may be implemented as a hub device by using a non-IP communication protocol, and solution information for resolving the corresponding error.

Figure 7:
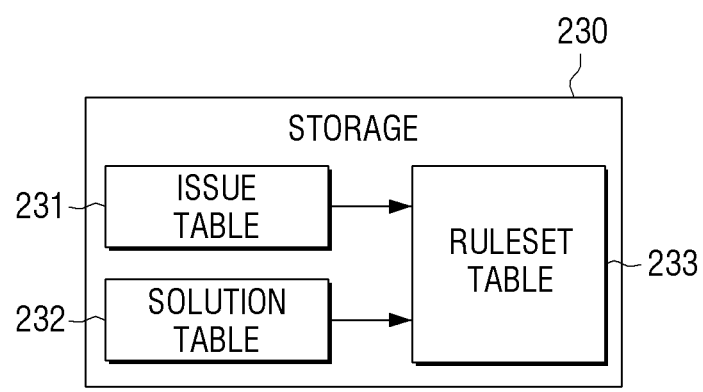
FIG. 7 is a diagram illustrating a storage of a management server, according to an example embodiment.

FIG. 7 is a diagram illustrating a storage of a management server, according to an example embodiment.

As illustrated in FIG. 7, the storage 230 includes an issue table 231, a solution table 232, and a ruleset table 233. The issue table 231 stores a plurality of event type information of an event that has occurred during a process in which a communication connection is made between at least one electronic device 100 and the external device 100 for each electronic device 100 implementable as a hub device or in a communicatively-connected state. The solution table 232 stores a plurality of solution information generated by an engineer by an event type. In addition, the ruleset table 233 matches solution information for an event type stored in the issue table 231 from among solution information stored in the solution table 232 and store it.

For example, issue information relating to the corresponding A to C events may be stored in the issue table 231, and the first and second solution information may be stored in the solution table 232. Meanwhile, the first solution information stored in the solution table 232 may be information for resolving an event related to A and B, and the second solution information may be information for resolving an event related to C.

In this case, the ruleset table 233 may match issue information corresponding to the respective A and B with the first solution information and store it, and match issue information corresponding to the C with the second solution information and store it.

Accordingly, the controller 220 may acquire solution information for event information received from the electronic device 100 on the basis of the ruleset table 233 stored in the storage 230.

Meanwhile, the controller 220 may acquire a plurality of issue information relating to event information from the ruleset table 233 stored in the storage 230. Solution information which differs for each of the acquired issue information may be matched and stored in the ruleset table 233. In this case, the controller 220 may, on the basis of a weight value of each information included in predefined event information, acquire issue information having the highest sum of weight values, and determine solution information related to the acquired issue information as information relating to the corresponding event information and transmit it to the electronic device 100.

FIG. 8 illustrates an example diagram which provides, by a management server, solution information for event information, according to an example embodiment.

As illustrated in FIG. 8, the management server 200 may acquire A issue information 820 and B issue information 830 regarding event information 810 received from the electronic device 100. In this regard, the A and B issue information 820 and 830 acquired regarding the event information 810 may include information corresponding to at least one of the information included in the event information 810. However, the example is not limited thereto, and the A and B issue information 820 and 830 acquired regarding the event information 810 may include information corresponding to more than a predetermined number of information from among the information included in the event information.

As illustrated, the event information 810 may include event type information (security key matching error), communication protocol information (ZigBee rev.20), application information (Home automation rev. 26), software information of an external device 10 (ZigBee Pro rev. 16), software information of the electronic device 100 (1.5.4) and information relating to the other external device 10 (Bulb by A manufacturer, temp sensor by B manufacturer, valve by C manufacturer).

In addition, the A issue information 820 may include the same information as the event type information, the communication protocol information and the application information from among the information included in the event information 810. The B issue information 830 may include the same information as the event type information, the communication protocol information, the software information of an external device 10 and the information relating to the other external device communicatively connected with the electronic device 100 from among the information included in the event information 810.

In this regard, the controller 220 may calculate a sum of weights of information including the same information as the event information 180 from among the information included in the A and B issue information 820 and 830, and compare the calculated sum of weights and determine issue information having a larger sum of weights as issue information relating to the event information 810.

As illustrated in the drawings, the sum of weights of the B issue information may be larger than that of the A issue information. In this regard, the controller 220 may determine that the B issue information is related to the event information 810, and acquire solution information matched regarding the B issue information 830 from the ruleset table 23 and transmit the acquired solution information to the electronic device 100.

Accordingly, the electronic device 100 may perform a processing operation for an event that has occurred between the electronic device 100 and the external device 10 on the basis of the solution information received from the management server 200.

Meanwhile, when the issue information relating to the event information received from the electronic device 100 is not acquired, the controller 220 transmits a signal for requesting history information to the electronic device 100. However, the example is not limited thereto, and the electronic device 100 may, when solution information is not received within a predetermined time after event information relating to an event occurring between the electronic device 100 and the external device 100 is transmitted to the management server 200, transmit history information to the management server 200.

When history information is received through the various example embodiments described above, the controller 220 may perform simulation regarding an event that has occurred between the electronic device 100 and the external device 10 on the basis of the received history information and the received event information.

In addition, the history information may be log/packet information which is transmitted or received between the electronic device 100 and the external device 10. When the solution information including the log/packet information is received, the controller 220 performs simulation regarding an event that has occurred between the electronic device and the external device 10 on the basis of the received history information and the received event information. Thereafter, the controller 220 generates solution information for resolving an event by analyzing a cause of an event that has occurred through simulation, and transmits the generated solution information to the electronic device 100.

However, the example is not limited thereto, and the controller 220 may analyze a cause of an event that has occurred through simulation, and select solution information which is capable of resolving the corresponding event from among pre-stored solution information and transmit it to the electronic device 100.

Figure 9:
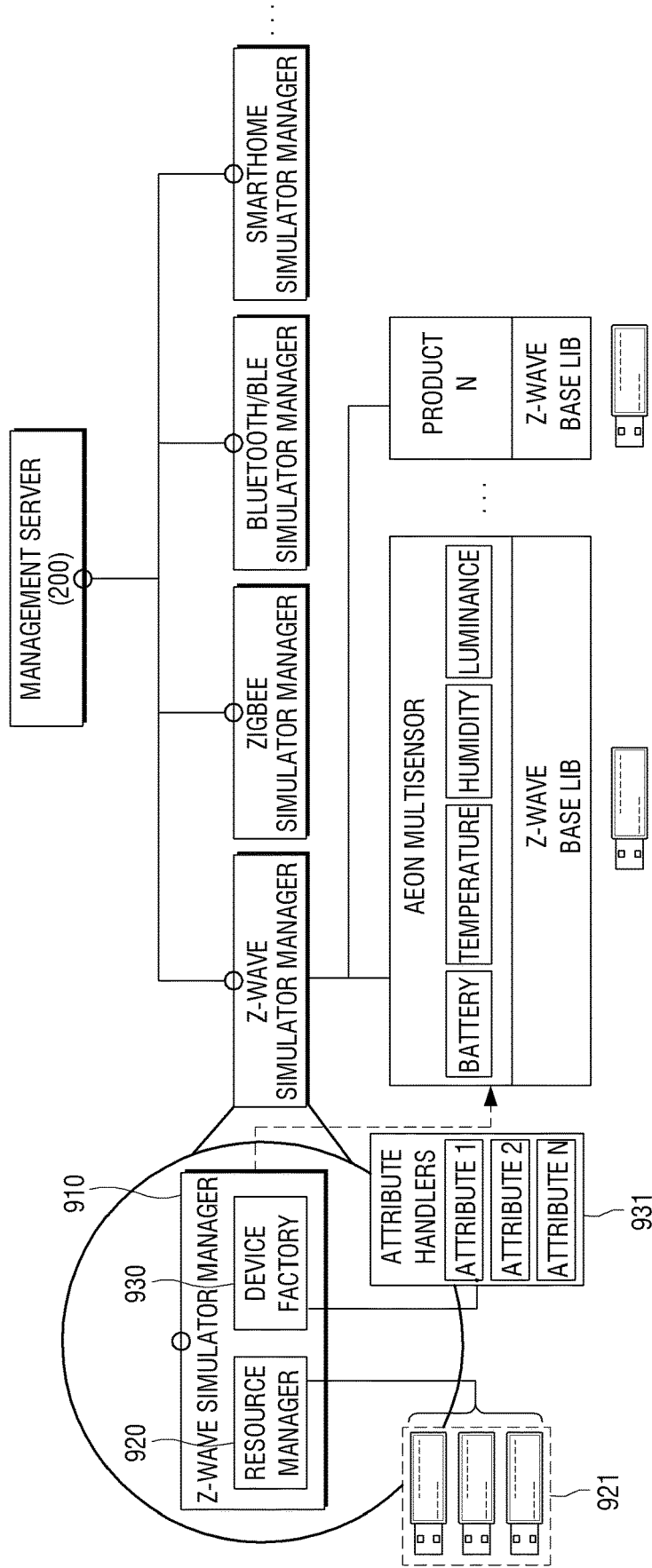
FIG. 9 is a block diagram for performing, by a management server, simulation of an event that has occurred in the process of communicative connection between an electronic device and an external device, according to an example embodiment.
Figure 10:
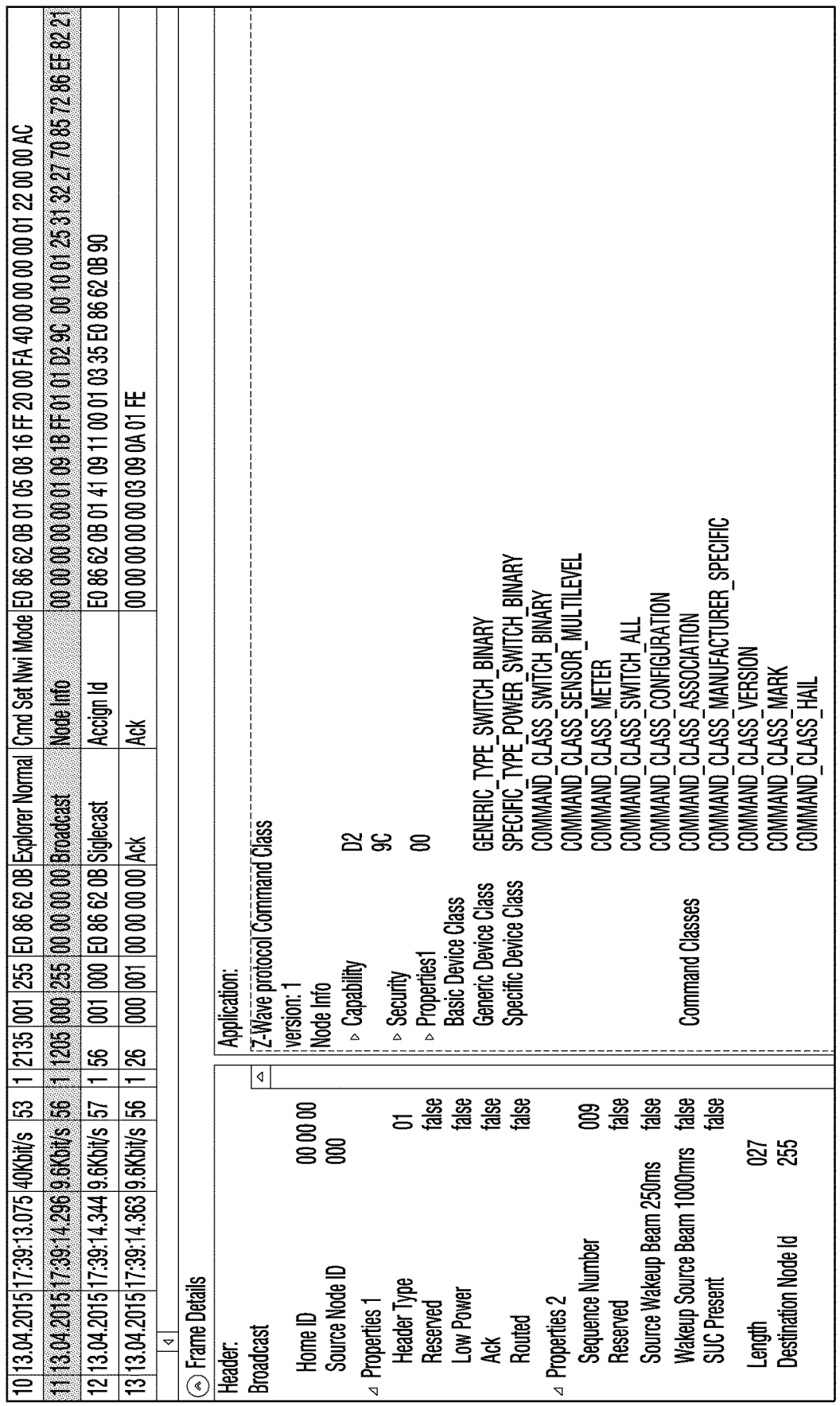
FIG. 10 is a diagram illustrating example log/packet information transmitted or received between an electronic device and an external device, according to an example embodiment.

FIG. 9 is a block diagram for performing, by a management server, simulation of an event that has occurred in the process of communicative connection between an electronic device and an external device, according to an example embodiment. FIG. 10 is a diagram illustrating example log/packet information transmitted or received between an electronic device and an external device, according to an example embodiment.

As illustrated in FIG. 9, the controller 220 generates a virtual device corresponding to the external device 10 on the basis of log/packet information included in history information received from the electronic device 100 and software information of the external device 10 included in the event information. The controller 220 may include a Z-wave simulator manager 910, and may generate a virtual device corresponding to the external device 10 through the Z-wave simulator manager 910.

In more detail, the electronic device 100 may transmit or receive the log/packet information as in FIG. 10, during a process in which a communication connection is made with the external device 10.

The electronic device 100 transmit or receive log/packet information for communicative connection with the external device 10. The transmitted or received log/packet information may include capability information as illustrated in FIG. 10. The capability information indicates a list of functions of the external device 10.

Accordingly, the Z-wave simulator manager 910 may combine attribute handlers 931 within a device factory 930 on the basis of the function list and generate at least one virtual device performing the same function. This virtual device may transmit or receive a packet via a dongle 921 connected with the management server 200. Accordingly, the Z-wave simulator manager 910 may reproduce the same environment as the environment in which an error occurs in the process of communicative connection between the electronic device 100 and the external device 10 through a packet transmitted or received to/from a virtual device.

Through this simulation, when the same event as an event regarding an error occurring during a process in which a communication connection is made between the electronic device 100 and the external device 100 occurs, the controller 220 may generate solution information for resolving an event by analyzing a cause of an event occurring through the simulation or determine issue information relating to the corresponding event from among pre-stored issue information, and acquire solution information which is matched with the corresponding issue information from the ruleset table 233.

When solution information for the event information is generated, the controller 220 may register the event information as new issues information, and match the registered issue information and the corresponding solution information and register and store the matching in the ruleset table 233.

As described above, the controller 220 according to an example embodiment may set a variety of environment conditions through a virtual device generated through the Z-wave simulator manager 910.

For example, a Z-wave virtual device including attributes including a battery, a temperature, humidity, and brightness, may be generated. In a case in which an environment in which an ambient temperature is 60 degrees is implemented, the Z-wave simulator manager 910 may set the current temperature at 60 degrees via the virtual device. Through this simulation, in a situation in which an ambient temperature is 60 degrees, the electronic device 100 may reproduce an environment in which the electronic device 100 is interlocked with the external device 10 and provide a service.

As another example, as described above, the electronic device 100 may perform a communicative connection with a security guard-related external device 10 via a Z-wave communication. Meanwhile, the security guard-related external device 100 may support an anti-theft command class V1, and the electronic device 100 may support only an updated anti-theft command class V2 which is updated regarding the anti-theft command class V1.

In this regard, an error may occur due to mismatching of versions of a communication protocol in the process of communicative connection between the electronic device 100 and the external device 10. Accordingly, the electronic device 100 may generate event information including an error type regarding this communication protocol version and transmit the generated event information to the management server 200.

In this case, the Z-wave simulator manager 910 may generate a virtual device supporting an anti-theft command class V1, and simulate a communication connection state between the external device 10 supporting the anti-theft command class V1 and the electronic device 100 supporting the anti-theft command class V2 through a packet transmitted or received to/from the generated virtual device.

So far, each component of the electronic device 100 and the management server 200 according to the example embodiment of the present disclosure is described in detail. Hereinbelow, a method of providing an event-related service in the electronic device 100 according to an example embodiment will be described.

Figure 11:
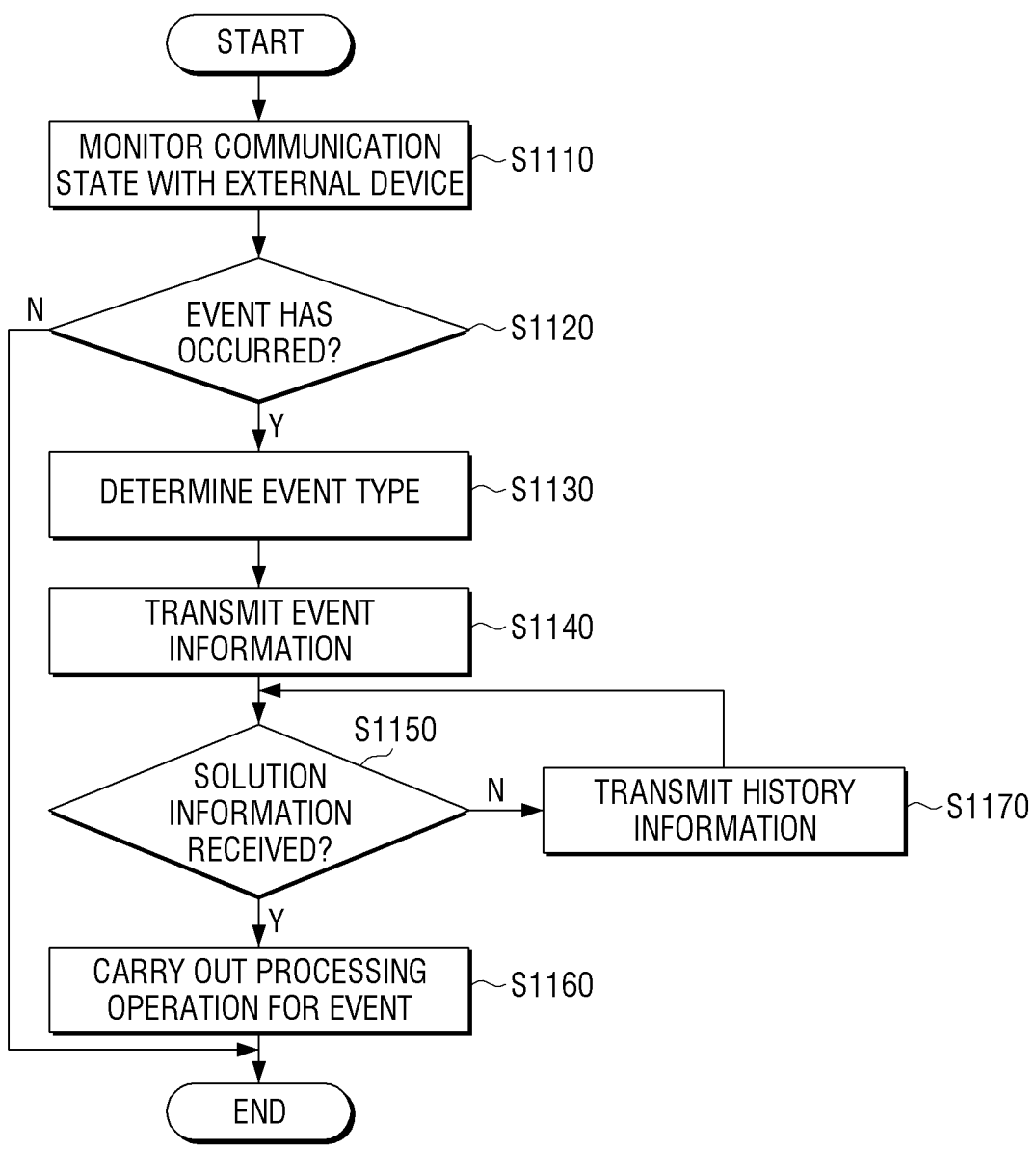
FIG. 11 is a flowchart of a method of providing an event-related service in an electronic device, according to an example embodiment.

FIG. 11 is a flowchart of a method of providing an event-related service in an electronic device, according to an example embodiment.

As illustrated in FIG. 11, the electronic device 100 monitors a communication state with the external device 10 on the basis of packet information transmitted or received to/from the external device 100, at operation S1110. Through monitoring, the electronic device 100 determines at least one of a communication connection state with the external device 100 and state information of the external device 100 and determines whether an event regarding the external device 10 has occurred, at operation S1120.

When it is determined that an event has occurred, the electronic device 100 determines an event type of an event that has occurred between the electronic device 100 and the external device 10, at operation S1130. Thereafter, the electronic device 100 generates event information according to the event type and transmits it to the management server 200, at operation S1140.

In more detail, the electronic device 100 may be communicatively connected with the external device 10 by using a non-IP communication protocol. Accordingly, the electronic device 100 may determine an event type on the basis of log/packet information transmitted or received during a process in which a communication connection is made with the external device 100 by using the non-IP communication protocol, and generate event information on the basis of the determined event type.

In this regard, the event information may include at least one of event type information relating to an event occurring between the electronic device 100 and an external device 10, communication protocol information and application profile information of the electronic device 100 and the external device 10 in which the event has occurred, communication channel information, software information of the electronic device 100 and the external device 10 in which the event has occurred, and information relating to the other external device 10 communicatively connected with the electronic device 100.

When this event information is generated, the electronic device 100 transmits event information to the management server 200 and determines whether solution information is received from the management server 200 after the event information is transmitted to the management server 200, at operation S1150.

As a result of determination, when solution information for event information is received from the management server 200, the electronic device 100 performs a processing operation for an event on the basis of the received solution information, at operation S1160.

According to an example embodiment, an event occurring between the electronic device 100 and the external device 10 may be an event regarding an error that has occurred in the process of communicative connection between the electronic device 100 and the external device 10. In this regard, the controller 120 may perform communicative connection between the electronic device 100 and the external device 100 on the basis of the solution information received from the management server 200.

According to an example embodiment, the controller 120 may automatically perform a communication setting between the electronic device 100 and the external device 10 on the basis of solution information received from the management server 200.

According to another example embodiment, the controller 120 provide guide information for resolving an error that has occurred in the process of communicative connection between the electronic device 100 and the external device 10 on the basis of the solution information received from the management server 120. Accordingly, the display 181, which will be described later, may display the guide information, and the user may input an execution command for communication setting between the electronic device 100 and the external device 10 on the basis of the displayed guide information. Thus, the controller 120 may perform a communication setting between the electronic device 100 and the external device 10 on the basis of the execution command of the user.

Meanwhile, an event occurring between the electronic device 100 and the external device 10 may be an event which is determined on the basis of state information included in packet information received from the external device 100 communicatively connected with the electronic device 100.

For example, the external device 10 communicatively connected with the electronic device 100 may be a temperature sensor which detects an ambient temperature. In this regard, the temperature sensor periodically detects an ambient temperature and transmits state information relating to the detected temperature to the electronic device 100 via a packet. Accordingly, the controller 120 may monitor a temperature detected in a temperature sensor on the basis of state information included in the packet information received from the external device, and when it is determined that a temperature of less than a predetermined threshold temperature or a temperature of greater than or equal to the predetermined threshold temperature is detected, generate the corresponding event information and transmits the generated event information to the management server 200.

Meanwhile, when a processing operation for an event that has occurred between the electronic device 100 and the external device 10 is performed on the basis of the solution information received from the management server 200, the electronic device 100 sends an event processing message to the management server 200. Accordingly, the management server 200 may determine that an event that had occurred between the electronic device 100 and the external device 100 has been resolved on the basis of the event processing message received from the management server 200.

Furthermore, when it is determined that an event occurring between the electronic device 100 and the external device 100 has been resolved on the basis of the received event processing message, the management server 200 may update a usage history of solution information provided regarding the event, and when a plurality of solution information is acquired regarding an event similar to the event, select one of the plurality of solution information on the basis of the updated usage history and provide the selected solution information.

When it is determined that the solution information is not received at operation S1150, the electronic device 100 transmits history information to the management server 200.

According to an example embodiment, the electronic device 100 may, when, after the event information is transmitted to the management server 200, solution information is not received from the management server 200 within a predetermined threshold time or a signal requesting history information is received from the management server 200, transmit history information to the management server 200.

In this regard, the history information may include log/packet information sent/received between the electronic device 100 and the external device 10, and this history information may be stored in the electronic device 100. Accordingly, the electronic device 100 may analyze a type of event that has occurred between the electronic device 100 and the external device 10 on the basis of pre-stored log/packet information. When the solution information for resolving an event is not received from the management server 200, the controller 120 may transmit history information including log/packet information to the management server 200.

Hereinabove, a method of providing, in an electronic device 100 according to an example embodiment, an event management service regarding an event that has occurred between the electronic device 100 and the external device 10 is described in detail.

Hereinafter, a method of providing, in a management server 200, solution information for resolving an event that has occurred between the electronic device 100 and the external device 10 is described in greater detail.

Figure 12:
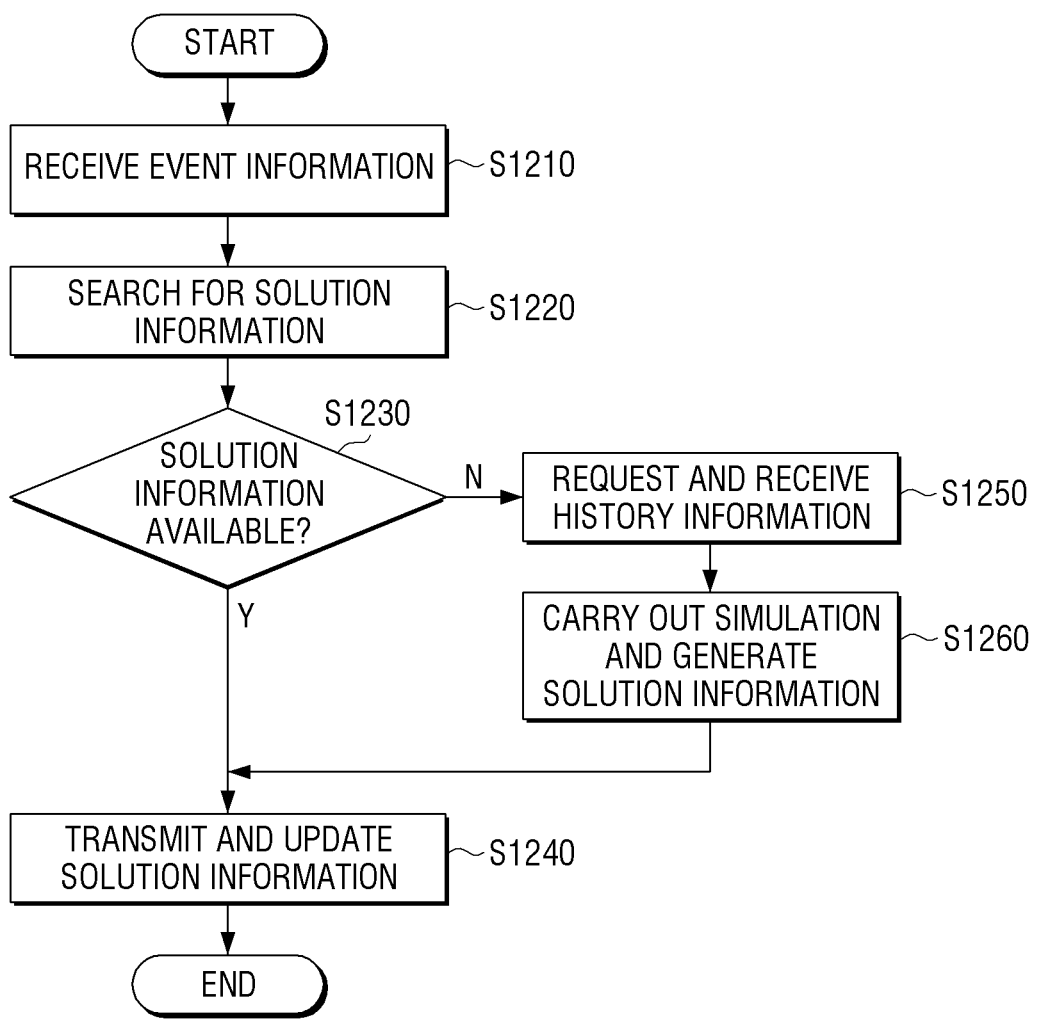
FIG. 12 is a flowchart of a method of providing solution information for an event that has occurred between an electronic device and an external device, according to an example embodiment.

FIG. 12 is a flowchart of a method of providing solution information for an event that has occurred between an electronic device and an external device, according to an example embodiment.

As illustrated in FIG. 12, when event information is received from the electronic device 100, the management server 200 searches whether solution information for the event information is present with reference to a pre-stored ruleset table, at operations S1210 and S1220.

As described above, the event information is information relating to an event which has occurred during a process in which a communication connection is made between the electronic device 100 and the external device 10 or information relating to an event which is determined on the basis of state information of the external device 10 communicatively connected with the electronic device 100. The event information may include at least one of event type information relating to an event occurring between the electronic device 100 and an external device 10, communication protocol information and application profile information of the electronic device 100 and the external device 10 in which the event has occurred, communication channel information, software information of the electronic device 100 and the external device 10 in which the event has occurred, and information relating to the other external device 10 communicatively connected with the electronic device 100.

When the event information is received, the management server 200 determines whether solution information for the received event information is registered and stored, at operation S1230. As a result of determination, when solution information for the event information is registered and stored, the management server 200 transmits the solution information to the electronic device 100 and updates history information according to the transmission of the solution information, at operation S1240.

According to an example embodiment, the management server 200 acquires solution information having the highest similarity to the received event information from among solution information of a predetermined number on the basis of a weight value predetermined for each of a plurality of information included in the event information received from the electronic device 100, and transmits the acquired solution information to the electronic device 100.

In more detail, the management server 200 may store at least one solution information according to a type of event. In other words, an engineer may define such that at least one solution information is matched according to a type of event. Accordingly, the management server 200 may store issue information relating to each of event types according to a condition defined by the engineer and a ruleset table to which at least one solution information is matched.

In this regard, the issue information may include at least one of event type information, communication protocol information, application profile information, software information of a hub device and a device, and information relating to the other device communicatively connected to the hub device. In this regard, the software information of the hub device is information for determining similarity of software information of the electronic device 100 described above. The software information of the device is information for determining similarity of software information of the external device 10. In addition, the information relating to the other device is information for determining similarity with respect to information relating to the other external device 10 communicatively connected with the electronic device 100 described above.

Accordingly, the management server 200 determines whether each information included in the event information is consistent with each information included for each issue information with reference to a pre-stored ruleset table. Thereafter, the management server 200 acquires information which is consistent with the information included in the event information from among each information for each issue information, and calculate the sum of pre-stored weights regarding the acquired information. Thereafter, the management server 200 acquires issue information which has the highest sum of weights from among the calculated sum of weights. When the issue information is acquired, the management server 200 may, with reference to a pre-stored ruleset table, acquire solution information matched with pre-acquired issue information and transmit the acquired solution information to the electronic device 100.

When it is determined that solution information for event information is not registered and stored at operation S1230 described above, the management server 200 transmits a signal requesting history information to the electronic device 100 and receives history information from the electronic device 100, at operation S1250. In addition, the history information may be log/packet information which is transmitted or received during a process in which a communication connection is made between the electronic device 100 and the third external device 10-3.

Thereafter, the management server 200 performs simulation regarding an event that has occurred between the electronic device 100 and the external device 10 on the basis of the received history information and the received event information, and analyzes the event through simulation and generates solution information for resolving the event. An event that has occurred through simulation may be the same error as an event that has occurred between the electronic device 100 and the external device 10. Accordingly, the management server 200 analyzes an event that has occurred through simulation, and when solution information for resolving the event is generated, transmits the generated solution information to the electronic device 100. Thereafter, the management server 200 may register the event information as new issue information, and match the registered issue information with the corresponding solution information and register and store the matched information in a pre-stored ruleset table.

Meanwhile, the control method of the user terminal 100 for providing the route guidance service as described above may be implemented by at least one execution program that may be stored in a non-transitory computer readable medium.

The non-transitory computer readable medium refers to a medium that stores data semi-permanently rather than storing data for a very short time, such as a register, a cache, a memory or etc., and is readable by an device. In detail, the foregoing programs may be stored in various types of recording media that are readable by a terminal, such as a RAM, a flash memory, a ROM, an erasable programmable ROM (EPROM), an electronically erasable programmable ROM (EEPROM), a register, a hard disk, a removable disk, a memory card, a USB memory, a compact-disk (CD) ROM, and the like.

Hereinabove, the present disclosure has been described with reference to various embodiments thereof.

While the present disclosure has been shown and described with reference to various embodiments hereof, it will be understood by those skilled in the art that various changes in form and details may be made therein without departing from the spirit and scope of the present disclosure as defined by the appended claims and their equivalents.

What is claimed is:
1. A method for providing an event management service, the method being performed by an electronic device and comprising:
   performing communication with a plurality of external devices;

monitoring a communication state of the communication between the electronic device and each of the plurality of external devices;

determining whether an error occurs in the communication between the electronic device and any of the plurality of external devices based on the monitoring of the communication state of the communication between the electronic device and each of the plurality of external devices;

based on determining that an error occurs in the communication between the electronic device and at least one of the plurality of external devices, acquiring error information regarding a cause of the error in the communication between the electronic device and the at least one of the plurality of external devices;

transmitting the acquired error information to an external management server;

receiving solution information regarding a solution for resolving the error from the external management server; and based on the solution information received from the management server, performing a processing operation for resolving the error in the communication between the electronic device and the at least one of the plurality of external devices based on the solution information, wherein the method further comprises, based on the electronic device not receiving the solution information from the external management server within a predetermined time, transmitting history information to the management server, and wherein the history information comprises log/packet information transceived between the electronic device and the external device for which the error occurred.

2. The method as claimed in claim 1, further comprising:
based on determining that the error occurs, determining an error type of the error,
wherein the error information includes at least one of information on the error type, communication protocol information of the electronic device and the at least one external device for which the error occurs, application profile information, communication channel information, software information of the electronic device and the external device for which the error occurs, or information on another external device communicatively connected with the electronic device.

3. The method as claimed in claim 2, wherein the solution information corresponds to the error type, and
wherein the received solution information comprises solution information for a solution selected from among a plurality of different solutions.

4. The method as claimed in claim 3, wherein selecting of the solution is based on a predetermined similarity between the solution information for the solution and the error information, according to respective weight values for each of a plurality of information items included in the error information.

5. The method as claimed in claim 2, further comprising:
transmitting history information to the management server based on receiving a history request signal from the external management server.

6. The method as claimed in claim 5, wherein the received solution information is based on a simulation of a communication state between the electronic device and the at least one external device of the plurality of external devices for which the error occurred based on the history information and the error information.

7. The method as claimed in claim 1, wherein the processing operation is performed automatically.

8. The method as claimed in claim 1, wherein the processing operation comprises:
displaying guide information for resolving the error based on the received solution information; and
executing a command according to an input to the guide information.

9. The method as claimed in claim 1, further comprising:
transmitting, to the external management server, an error processing message, based on the processing operation.

10. The method as claimed in claim 1, wherein the at least one external device of the plurality of external devices for which the error occurs is communicatively connected with the electronic device via a non-IP communication protocol.

11. An electronic device, comprising:
a communicator comprising communication circuitry; and
a processor configured to:
control the communicator to perform communication with a plurality of external devices;
monitor a communication state of the communication between the electronic device and each of the plurality of external devices;
determine whether an error occurs in the communication between the electronic device and any of the plurality of external devices based on the monitoring of the communication state of the communication between the electronic device and each of the plurality of external devices;
based on determining that an error occurs in the communication between the electronic device and at least one of the plurality of external devices, acquire error information regarding a cause of the error in the communication between the electronic device and the at least one of the plurality of external devices;
control the communicator to transmit the acquired error information to an external management server;
control the communicator to receive solution information regarding a solution for resolving the error from the external management server; and
based on the solution information received from the management server, perform a processing operation for resolving the error in the communication between the electronic device and the at least one of the plurality of external devices based on the solution information,
wherein, the processor is configured to, based on the electronic device not receiving the solution information from the external management server within a predetermined time, control the communicator to transmit history information to the management server, and
wherein the history information comprises log/packet information transceived between the electronic device and the external device for which the error occurred.

12. The electronic device as claimed in claim 11, wherein the processor is configured to, based on determining that the error occurs, determine an error type of the error, and
wherein the error information includes at least one of information on the error type, communication protocol information of the electronic device and the at least one external device for which the error occurs, application profile information, communication channel information, software information of the electronic device and the external device for which the error occurs, or information on another external device communicatively connected with the electronic device.

13. The electronic device as claimed in claim 12, wherein the solution information corresponds to the error type, and wherein the received solution information comprises solution information for a solution selected from among a plurality of different solutions.

14. The electronic device as claimed in claim 13, wherein selecting of the solution is based on a predetermined similarity between the solution information for the solution and the error information, according to respective weight values for each of a plurality of information items in the error information.

15. The electronic device as claimed in claim 12, wherein the processor is configured to control the communicator to transmit history information to the management server based on receiving a history request signal from the external management server.

16. A system comprising an electronic device and a management server external to the electronic device, wherein the electronic device comprises:
   a first communicator comprising communication circuitry; and
   a first processor configured to:
      control the first communicator to perform communication with a plurality of external devices;
      monitor a communication state of the communication between the electronic device and each of the plurality of external devices;
      determine whether an error occurs in the communication between the electronic device and any of the plurality of external devices based on the monitoring of the communication state of the communication between the electronic device and each of the plurality of external devices;
      based on determining that an error occurs in the communication between the electronic device and at least one of the plurality of external devices, acquire error information regarding a cause of the error in the communication between the electronic device and the at least one of the plurality of external devices;
      control the first communicator to transmit the acquired error information to the management server;
      control the first communicator to receive solution information for resolving the error from the management server; and
      based on receiving the solution information, perform a processing operation for resolving the error in the communication between the electronic device and the at least one of the plurality of external devices based on the solution information,
   wherein, the first processor is configured to, based on the electronic device not receiving the solution information from the external management server within a predetermined time, control the first communicator to transmit history information to the management server,
   wherein the history information comprises log/packet information transceived between the electronic device and the external device for which the error occurred, and
   wherein the management server comprises:
      a second communicator including communication circuitry; and
      a second processor configured to:
         control the second communicator to receive the error information;
         generate, as the solution information, solution information based on the error information; and
         control the second communicator to transmit the solution information to the electronic device.

17. The system according to claim 16, wherein the second processor is configured to:
   determine respective similarities between the error information and solution information for each of the plurality of different solutions corresponding to an error type of the error; and
   select, as the solution information, the solution information having a highest similarity to the error information.

18. The system according to claim 17, wherein the error information comprises a plurality of information items, each information items a weight value respectively associated therewith.

19. The system according to claim 17, wherein the second processor is configured to:
   based on no solution information having a similarity to the error information greater than a predetermined similarity, perform a simulation of a communication state between the electronic device and the external electronic device; and
   generate the solution information based on the simulation.

20. The system according to claim 19, wherein the simulation is based on the history information.

* * * * *